United States Patent [19]

Warner, Jr.

[11] 4,099,832
[45] Jul. 11, 1978

[54] OPTICAL FIBER CONNECTOR UTILIZING NESTED ROD ARRANGEMENT

[75] Inventor: Arthur Woodward Warner, Jr., Whippany, N.J.

[73] Assignee: Bell Telephone Laboratories, Incorporated, Murray Hill, N.J.

[21] Appl. No.: 754,603

[22] Filed: Dec. 27, 1976

[51] Int. Cl.² ............................................. G02B 5/14
[52] U.S. Cl. ................................................. 350/96.21
[58] Field of Search .................................... 350/96 C

[56] References Cited

U.S. PATENT DOCUMENTS

| | | | |
|---|---|---|---|
| 3,989,567 | 11/1976 | Tardy | 350/96 C X |
| 4,019,241 | 4/1977 | Logan | 350/96 C X |
| 4,047,796 | 9/1977 | Kao et al. | 350/96 C |
| 4,050,783 | 9/1977 | Tardy | 350/96 C |

*Primary Examiner*—John K. Corbin
*Assistant Examiner*—Rolf Hille
*Attorney, Agent, or Firm*—Michael J. Urbano

[57] ABSTRACT

Described is an optical fiber connector in which accurate alignment is achieved by having the fiber enclosed by three parallel inner rods. Two sets of inner rods, and hence two fibers, are aligned by means of a resilient sleeve containing three additional (outer) rods along which the inner rods can glide. In one embodiment the sleeve is a metal tube and the outer rods are affixed to its inner surface, whereas in a second embodiment, adapted for mounting an array of connectors, the sleeve is a rubber-like material into which the outer rods are molded. A plurality of such sleeves are mounted in holes in a rigid support member.

12 Claims, 4 Drawing Figures

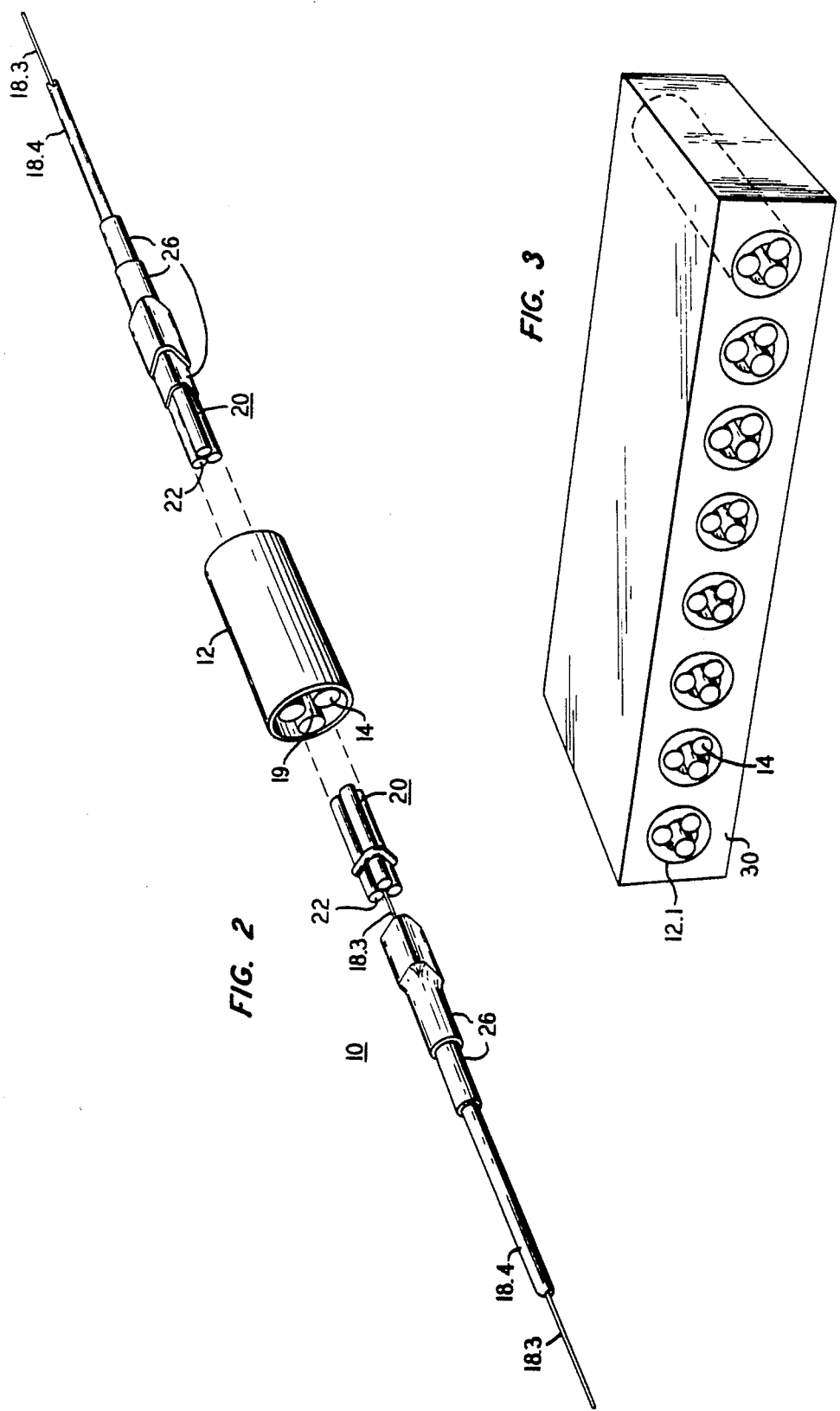

OPTICAL FIBER CONNECTOR UTILIZING NESTED ROD ARRANGEMENT

CROSS-REFERENCE TO RELATED APPLICATIONS

This application was filed concurrently with application Ser. No. 754,601 of C. R. Sandahl entitled "Optical Fiber Connection" and application Ser. No. 754,602 of J. S. Cook and C. R. Sandahl entitled "Hermaphrodite Optical Fiber Connector".

BACKGROUND OF THE INVENTION

This invention relates to optical fiber or fiberguide connectors.

Fiber-optic communication channels have great promise as the "wire and cable" of tomorrow. They have larger signal carrying capacity, are lighter in weight, smaller in size and potentially lower in cost than their electrically conductive counterparts. In addition, they are immune to electromagnetic and radio frequency interference and offer advantages in eliminating cross-talk and in assuring privacy.

Recent improvements in fiber-optic transmission lines, both in performance and in mechanical strength, are impressive and promise widespread application in the very near future. One of the persistent problem areas, however, in the practical application of fiber optics for communications has been that of the optical fiber connector.

The problem of connecting fibers can be simply stated. Adjacent fiber ends must be flat, perpendicular, and polished as well as aligned axially and transversely. The difficulty arises when dimensional tolerances are considered. In order to keep optical loss negligible, i.e., about 0.1 dB, the transverse alignment error must be less than 1/20 the fiber core diameter and the axial separation less than ½ the core diameter. Practical multimode fiber core diameters are likely to be 50 to 250 $\mu$m (0.002 inch to 0.010 inch), and therefore positional errors of the fiber core of even 0.0001 inch would result in measurable loss. Another requirement not imposed on wire connectors is that of cleanliness. The making or breaking of the connection must not generate debris that could obstruct the light path or alter the alignment of the fibers.

The necessary alignment could be accomplished by making an adjustable connector, but this procedure would be cumbersome and the apparatus costly. Many designs involving numerous complex parts machined to close tolerances have been shown to operate satisfactorily, particularly with the larger fibers or fiber bundles. See, for example, T. Bowen, "Fiber Optics as an Interconnecting Medium," Electronic Packaging and Production, pp. 17-32 (April 1976). Whether or not such designs, if standardized and made in large quantities, would be reasonable in cost is yet to be demonstrated.

It is therefore an object of my invention to provide a simple, precise, low cost optical fiber connector.

It is another object of my invention to alleviate the need for expensive machining of connector parts to critically tight tolerances, it being possible to assemble my connector largely from inexpensive, off-the-shelf, precision components.

SUMMARY OF THE INVENTION

Accordingly, my optical fiber connector comprises a resilient, hollow, cylindrical sleeve and three parallel cylindrical members (outer rods) affixed to the inner surface of the sleeve. The outer rods are spatially separated with centers on radial axes 120° apart and extend parallel to the cylinder axis of the sleeve. The fibers to be connected each have end portions mounted in mate half-connectors which are insertable into the sleeve. Each half-connector comprises a second set of three parallel cylindrical members (inner rods) in mutual contact with one another along their length so as to form an inscribed cylindrical aperture therebetween. The fiber is secured within the aperture to the inner rods, and the inner rods and the fiber end portion terminate in a planar surface substantially perpendicular to the cylinder axis. The diameters of the inner and outer rods are mutually adapted so that, when a half-connector is inserted into one end of the sleeve, each outer rod makes contact with two adjacent inner rods. A second half-connector is inserted into the other end of the sleeve until the planar surfaces of the inner rods are in contact, thereby aligning the end portions of the fibers. The ends of the rods are preferably curved to facilitate insertion of the half-connectors.

In one embodiment the sleeve is a metal tube and the outer rods are welded to its inner surface. In a second embodiment adapted for mounting an array of connectors, the sleeve is a rubber-like material into which the outer rods are molded. The sleeves are mounted in a plurality of holes in a rigid support member to provide mechanical strength and to fix the configuration of the array.

An important feature of my connector resides in arranging the outer rods so that they do not contact one another. This arrangement, in conjunction with the resiliency of the sleeve, permits the automatic self-aligning of the half-connectors. For example, in the case where the inner rods are slightly undersized, the outer rods, under the urging of the sleeve, contract around the inner rods to effect alignment, and conversely expand for slightly oversized inner rods.

Another feature resides in mutually adapting the diameters of the inner and outer rods so that the force imparted by the sleeve through the outer rods tends to keep the inner rods in contact with one another.

An advantage of my invention is that it can exoplit the well developed technology of the roller bearing industry by employing inexpensive, precise, uniform cylindrical needle bearings as the inner and outer rods of the connector. These standard rollers are commercially available at a cost of approximately one cent each.

BRIEF DESCRIPTION OF THE DRAWING

These and other objects of my invention, together with its various features and advantages, can be readily understood from the following more detailed description taken in conjunction with the accompanying drawing, in which:

FIG. 2 is an exploded pictorial view showing how the connector of FIG. 1 is used to align a pair of optical fibers;

FIG. 3 is a pictorial view of an array of outer rod-sleeve assemblies mounted in a rigid support member in accordance with another embodiment of my invention.

DETAILED DESCRIPTION

Figure 1:
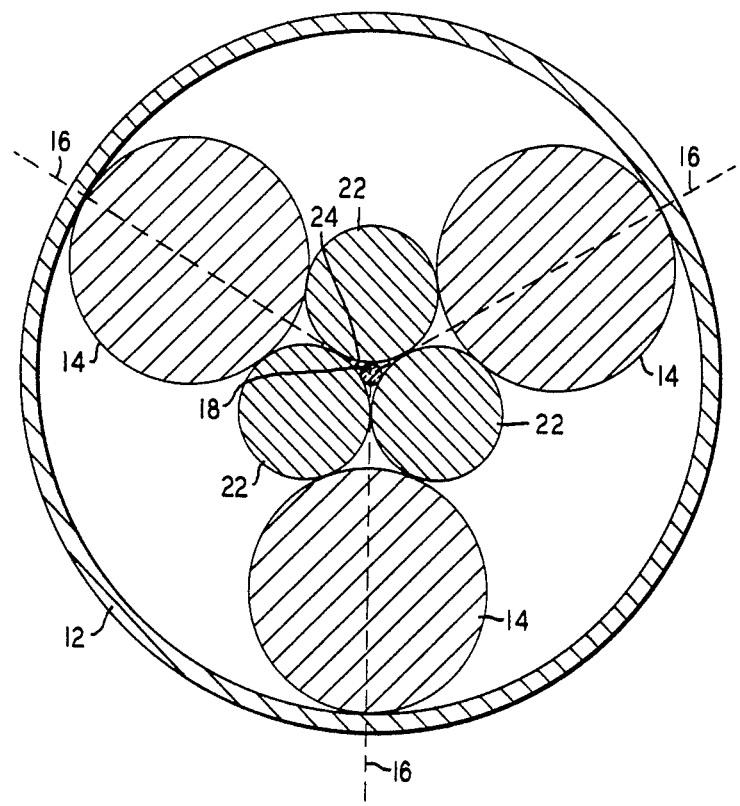
FIG. 1 is a cross-sectional view of an optical fiber connector in accordance with an illustrative embodiment of my invention.

With reference now to FIGS. 1 and 2, an optical fiber connector 10 comprises a resilient, hollow, cylindrical sleeve 12 and three parallel cylindrical members 14 (outer rods) affixed to the inner surface of sleeve 12. The outer rods 14 are spatially separated from one another with centers on radial axes 16 which are substantially 120° apart. The fibers 18 to be connected each have end portions mounted in male half-connectors 20 which are insertable into sleeve 12. Each half-connector 20 comprises a second set of three parallel cylindrical members 22 (inner rods) which contact one another along their length so as to form an inscribed cylindrical aperture 19. Fiber 18 is secured within the aperture 19 to inner rods 22 as, for example, by filling the space 24 between the fiber 18 and rods 22 with epoxy or other suitable cement. The inner rods 22 and the end portion of fiber 18 terminate in a planar surface substantially perpendicular to the cylinder axis of sleeve 12; i.e., perpendicular to the longitudinal axis of fiber 18. The diameters of the inner rods 22 and outer rods 14 are mutually adapted so that, when a half-connector 20 is inserted into one end of sleeve 12, each outer rod 14 makes contact substantially along its entire length with two adjacent inner rods 22. A second half-connector 20 is inserted into the other end of the sleeve until the planar surfaces formed by the ends of the inner rods 22 abut, thereby aligning the end portions of the fibers. Preferably the ends of the rods are curved or spherical to facilitate insertion of the half-connectors.

The particular nested configuration of the inner and outer rods is important in achieving automatic self-alignment of the fibers. More specifically, the outer rods are spatially separate, i.e., not in contact with one another, so that, when the inner rods are inserted, the resilient sleeve can expand slightly and then contract to force the inner rods into alignment. In addition, this configuration allows accommodation of dimensional deviation of the rods, especially if one or more of the inner rods is undersized in diameter.

Another feature of the nested rods is the provision of larger diameter outer rods 14 adapted to force the inner rods 22 together. To this end, I have found that the ratio of the diameters of the outer to inner rods should be 1.5:1 or greater. With smaller ratios the force transmitted by the sleeve 12 through the outer rods 14 tends to separate the inner rods 22 and may cause misalignment errors or may even crack the epoxy or other cement which secures the fiber 18 to rods 22.

Figure 4:
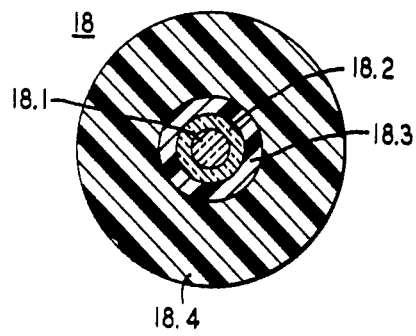
FIG. 4 is a cross-sectional view of a typical optical fiber.

A typical fiber 18 is shown in FIG. 4. It comprises a core 18.1 surrounded by a cladding 18.2. Both are typically glass. A nylon coating 18.3 surrounds the cladding and a PVC protective sleeve 18.4 surrounds the coating.

As shown in FIG. 2, the half-connectors 20 include heat shrinkable tubing 26 to provide strain relief to the assembly, especially at the back end of the half-connector. The tubing 26 covers only the portion of rods 22 rearward of the planar surfaces, leaving the proximate portion of the rods 22 exposed for ready insertion into sleeve 21. The tubing 26 adheres to the PVC sleeve 18.4 of fiber 18 and to an epoxy anchor 32 which surrounds inner rods 22.

In addition, it will be noted that the nylon coating 18.3 which surrounds the cladding 18.2 is compressible under the force of the inner rods 22. Consequently, as discussed hereinafter, this coating acts as a variable self-centering member.

In a specific exemplary embodiment of my optical connector, the inner and outer rods were cylindrical needle bearings commercially available from the Torrington Bearing Co. of Torrington, Conn. The precision of the bearings was adequate: the overall tolerance of the diameter was ±0.0001 inch, but if necessary could be selected to a tolerance of 0.000025 inch. The standard rollers cost about one cent each, were made of chrome steel, and were lapped and polished on their ends.

These precision rollers (rods), as off-the-shelf items, are graded in increments of 1/64 of an inch, with a wide choice of lengths. The standard rod has a spherical end which is effective in guiding the half-connectors 20 into sleeve 12. The maximum diameter cylinder (i.e., fiber core plus cladding diameter) which will fit in the aperture 19 formed by inner rods 22 is directly related to the roller diameter. The relationship is 1 to 6.4641. Therefore, for off-the-shelf roller dimensions, the apertures 19 available to position an optical fiber are 4.8, 7.2, 9.7 etc. thousandths of an inch (mils) in diameter. For example, a large core fiber developed for use with incoherent light sources in an electronic switching system is well suited to the 9.7 mil diameter opening. This fiber, shown in FIG. 4, consists of a 5 mil glass core 18.1 surrounded by 1.5 mil thick glass cladding 18.2 giving a core-cladding diameter of about 8.25 mils. A thin nylon protective coating 18.3 about 1 mil thick brings the diameter to 11 mils. When this fiber is clamped by the three inner rods 22, (the PVC sleeve 18.4 is first stripped back), the nylon coating is slightly deformed or extruded into the available space but the glass core-cladding remains unstressed and centered well within ±0.5 mil. It should be noted that no stripping of the protective nylon coating is required, and in fact the coating actually permits a wider tolerance on the core-cladding diameter than if it were not used.

In an illustrative specification for the optical fiber, the core-cladding diameter was controlled to between 8.1 and 9.3 mils. Of the approximately 100 fiber ends prepared, using inexperienced personnel and first generation tooling, about 80% were centered within 0.5 mil. These results indicate that an acceptable yield can be obtained with a specification requiring centering of the fiber core and cladding to this tolerance.

The diameter of the rollers (rods) themselves are extremely uniform as purchased, but the three assembled inner rods 22 were checked for size to within 0.1 mil by means of hole gauges. It would appear, that the centering error will in large part depend on the fiber to be centered, with considerable latitude permitted because the nylon coating acts as a variable self-centering sleeve for the core-cladding portion of the fibers. The following table lists the permissible combinations of uncoated optical fibers and standard rollers. Dimensions are in inches, and the diameter tolerance of all Torrington rods was + 0.0000 and − 0.0002.

| Opening For Uncoated Cylindrical Fiber | Standard Inner Rod (Roller) Dia. | Suggested Outer Rod (Roller) Dia. |
| --- | --- | --- |
| 0.00483 | 0.0312 | 0.0469 |
| 0.00726 | 0.0469 | 0.0781 |
| 0.00967 | 0.0625 | 0.0938 |
| 0.0121 | 0.0781 | 0.1250 |
| 0.0145 | 0.0938 | 0.1562 |
| 0.0169 | 0.1094 | 0.1875 |

As noted previously, sleeve 12 functions to guide the precise half-connectors 20 when making a connection. An economical way to achieve this guidance to the required precision was, once again, to use standard rollers for the outer rods 14. The outer rods 14, which are preferably larger than the inner rods 22, acted as self-aligning rails along which the inner rods 22 glide. The outer rods, however, needed only to be straight to accomplish their purpose. Outer rods 1.5 times the diameter of the inner rods were preferred because they provide a net compressive force on the half-connectors.

The positioning of the outer rods 14 in the sleeve 12 should permit easy insertion of the inner rod assembly on the one hand, and yet apply sufficient tension to bring about the self-alignment of the whole connector assembly on the other. The tensioning action should also be great enough to overcome stress which might be externally applied to the connector e.g., from the weight of optical cables or the method of routing the cables.

In one embodiment of the foregoing connector, sleeve 12 comprised thin-walled stainless steel tubing. The tension of the sleeve is controlled by the wall thickness and the shape of the tubing. For example, I found that a 0.300 inch diameter tube with an 0.006 inch wall could be inelastically distorted using a three jaw chuck to provide a fine adjustment of the diameter of the circle inscribed by the outer rods. The diameter of the outer and inner rods was 3/32 inch and 1/16 inch, respectively.

In a second embodiment adapted for mounting an array of connectors shown in FIG. 3, the sleeve comprised an annular rubber-like member 12.1 carried by a rigid support member or panel 30. In practice, the outer rods 14 were molded into the rubber sleeve and the panel 30 comprised polystyrene. The advantage of the rubber sleeve is that the outermost diameter of the sleeve may now be interfaced with a rigid body, whereas in the previous embodiment the steel tubing should be free to provide resiliency. The use of a rubber-like sleeve enables a plurality of sleeves to be assembled to form a jack field simply by drilling holes in an appropriate panel.

The tensioning provided by this embodiment is a function of the rubber-like material, the size of the hole that receives the sleeve-outer rod assembly, and the design of the core used in the molding operation. The core should be made such that the outer rods 14 assume a slightly smaller inscribed circle than the circumscribed circle required to hold the inner rods 22, yet provide clearance for free travel along the outer rods of the sleeve 12. Polyurethane of Shore.A hardness 50 is one rubber-like material that has been found to be adequate. It is commercially available from N.L. Industries, Hightstown, New Jersey.

One of the more important operations in the fabrication of the connector is the alignment and bonding of the three inner rods 22 to the fiber 18. The three inner rods must be held strictly parallel to each other and in mutual contact, and then bonded with the fiber in place. A jig was used for this purpose. The jig had a pair of horizontally translatable jaws which formed a trapezoidal opening when closed and a vertically translatable jaw which could be closed over the top of the trapezoidal opening. Two of the inner rods were first clamped parallel to one another by placing them next to one another at the bottom of the trapezoidal opening and closing the horizontal jaws. Second, an end portion of the fiber, after being stripped of the PVC and coated with an epoxy, was laid along the intersection of the two rods. Next, the third inner rod was put in place on top of the other two and the vertical jaw was lowered to force the fiber into place. The entire assembly was then baked to cure the epoxy. The amount of epoxy used was controlled to slightly overfill the aperture 24 and extrude from the ends, yet not so much as to interfere with the subsequent insertion of the half-connector 20 into sleeve 12. The epoxy was illustratively a one part heat curing structured adhesive, Scotch-Weld 2214, which cures in 40 minutes at 120° C and makes a high strength bond with metals, glass, and some plastics. This epoxy is manufactured by the 3M Company, Minnesota.

At this stage of the fabrication process the fiber extends beyond the ends of the inner rods by a few millimeters or more to allow for proper end preparation and polishing.

As mentioned previously the protective coating 18.4 on the optical fiber should be secured by some appropriate means to the inner rods 22 in order to reduce strain and to prevent an abrupt bend or kink where the fiber enters the inner rods. One method is shown in FIG. 2, where the same epoxy bonds the inner rods was used to form an anchor 32 toward the back of the half-connector 20. Then several layers of heat shrinkable tubing 26 were applied, as required, to form a handle and to provide strain relief. The tubing 26 adhered to the outer jacket 18.4 of the fiber 18. The jacket was typically 100 mil diameter PVC. A simple spring clip (not shown), or other suitable means of securing the half-connectors and sleeve together, may be used to insure that the fiber connection, once made, stays in place.

As stated above, the making of a connection between two optical fibers consists of aligning, axially and transversely, their flat, perpendicular, and polished ends. One simple way to prepare a fiber end is to break the fiber by scribing and bending. However this method does not insure a perpendicular end, and many glass fibers, because of the high internal stresses implicit in their design, do not break cleanly or uniformly. A more positive approach was to polish the ends. The half-connector with the fiber firmly epoxied to the inner rods was trimmed and polished in two stages by hand, using first a 3$\mu$m alumina and finally cerium oxide. The result was a polished end, with the optical core slightly concave.

Finally, a protective coating of silicone rubber compound was placed over the ends of both the fiber and the inner rods 22. Thus, when two half-connectors 20 were brought together, the silicone acted as both a buffer and a seal. The thickness of 0.5 mil for the silicone layers was adequate for this purpose.

Testing of the optical connector was largely one of checking dimensional tolerances. By assuring that mechanical tolerances were met, and that the fiber end was polished, satisfactory optical performance could be obtained.

The inner rod assembly was checked by use of a series of hole gauges, the correct one being 0.1346 inch for inner rods of 1/16 inch diameter. Centering of the fiber core was checked by rotating the assembly in the hole gauge, and observing the run-out using a 400× microscope. Next, light was introduced from the other end of the fiber, and the circularity and uniformity of the light observed. A very high degree of centering, approaching the precision of the roller, can be expected as fiber dimensions come under increasingly better control.

It is to be understood that the above-described arrangements are merely illustrative of the many specific embodiments which can be devised to represent application of the principles of our invention. Numerous and varied other arrangements can be devised in accordance with these principles by those skilled in the art without departing from the spirit and scope of the invention.

What is claimed is:

1. An optical fiber connector comprising:
   a cylindrical resilient sleeve,
   three outer rods affixed to the inner surface of said sleeve, said outer rods being parallel to the cylinder axis of said sleeve and disposed in spaced relation to one another about said axis,
   three inner rods extending parallel and in mutual contact with one another, thereby forming a cylindrical aperture therebetween,
   an optical fiber disposed within said aperture and secured to said inner rods,
   the diameter of said outer rods being larger than the diameter of said inner rods so that, when said inner rods are inserted between said outer rods, each of said outer rods contacts a pair of adjacent inner rods along their length and a net compressive force is supplied to said inner rods.

2. The connector of claim 1 wherein the diameter of said outer rods is at least 1.5 times the diameter of said inner rods.

3. The connector of claim 1 wherein said sleeve comprises a thin walled metal tube, said outer rods are metallic, and said outer rods are affixed to said inner surface by a weld, epoxy or other suitable means.

4. The connector of claim 1 wherein said sleeve comprises a rubber-like material, said outer rods are molded into said material, and including a rigid support member which surrounds said sleeve.

5. The connector of claim 4 wherein said rigid support member has a plurality of spatially separate bores which extend between opposite major surfaces thereof, a separate one of said sleeves with outer rods molded therein being positioned within each of said bores.

6. The connector of claim 1 wherein said outer rods have their centers on radial axes separated from one another by substantially 120°.

7. The connector of claim 1 wherein said inner rods and the end of said fiber terminate in a planar surface substantially perpendicular to said cylinder axis.

8. The connector of claim 7 wherein said inner rods include an exposed forward portion adjacent said planar surface and including means surrounding a rearward portion of said rods for providing mechanical strength.

9. The connector of claim 8 wherein said surrounding means comprises heat shrinkable tubing.

10. The connector of claim 1 wherein said fiber includes a maleable coating which is compressible under the urging of said inner rods.

11. For use in an optical fiber connector in which three inner rods extend parallel and in mutual contact with one another, thereby forming a cylindrical aperture therebetween, and an optical fiber is disposed within said aperture and secured to the inner rods, a guide member comprising:
    a cylindrical resilient sleeve, and
    three outer rods affixed to the inner surface of said sleeve, said outer rods being parallel to the cylinder axis of said sleeve and disposed in spaced relation to one another about said axis,
    the diameter of said outer rods being greater than the diameter of said inner rods and adapted so that, when said inner rods are inserted between said outer rods, each of said outer rods contacts a pair of adjacent inner rods along their length and a net compressive force is supplied to said inner rods.

12. The guide member of claim 11 wherein the diameter of said outer rods is at least 1.5 times the diameter of said inner rods.

* * * * *

UNITED STATES PATENT AND TRADEMARK OFFICE
CERTIFICATE OF CORRECTION

PATENT NO. : 4,099,832
DATED : July 11, 1978
INVENTOR(S) : Arthur W. Warner, Jr.

It is certified that error appears in the above—identified patent and that said Letters Patent are hereby corrected as shown below:

Column 3, line 61, "21" should be --12--.  Column 6, line 3, "pur" should be --put--; line 25, after "epoxy" insert --which--.  Column 7, line 4, after "many" insert --possible--.

Signed and Sealed this

Seventeenth Day of July 1979

[SEAL]

Attest:

LUTRELLE F. PARKER

*Attesting Officer*     *Acting Commissioner of Patents and Trademarks*